June 3, 1969        A. DOUNOUCOS        3,447,286
TOTALLY ENCLOSED LIQUID PERMSELECTIVE MEMBRANE
Filed Aug. 2, 1967
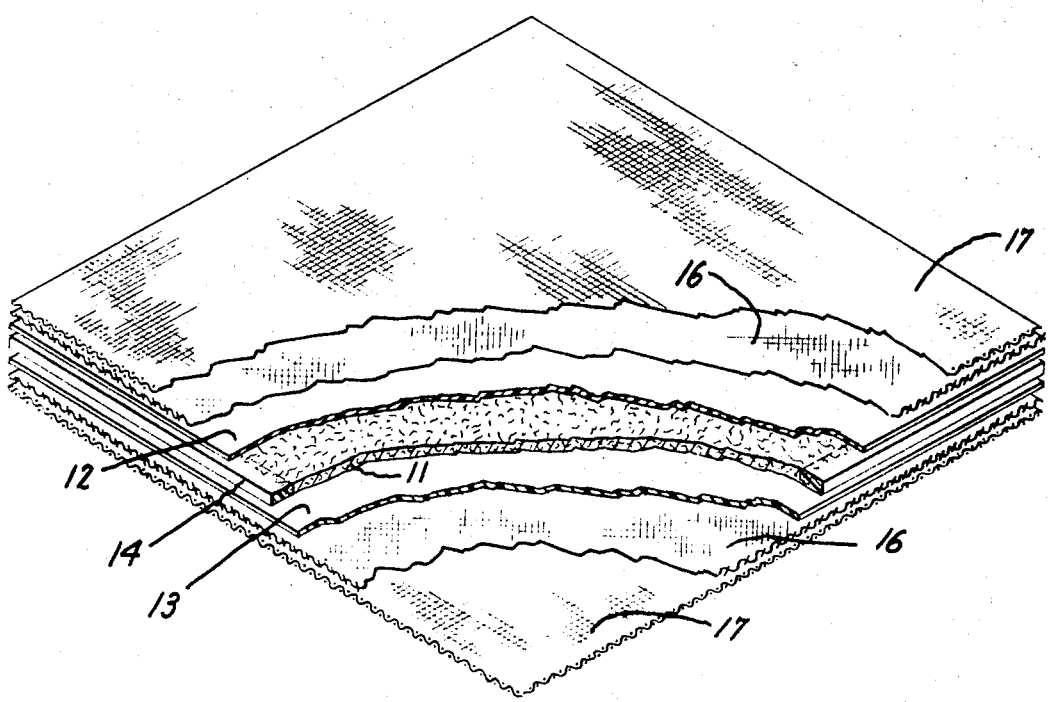
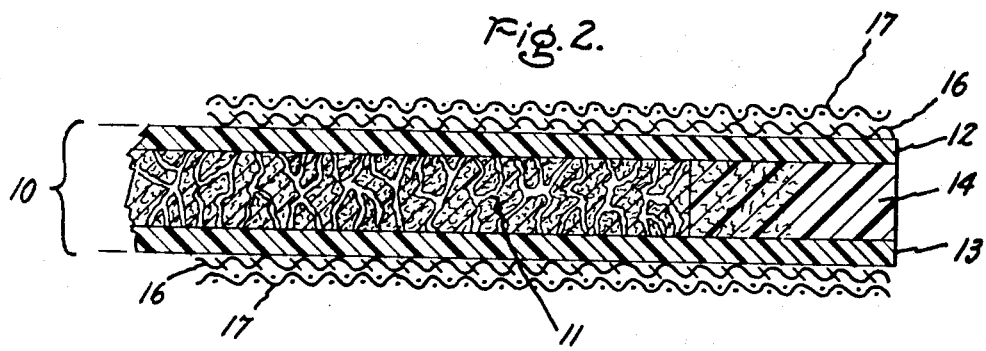
Inventor:
Angelo Dounoucos,
by *Leo J. Martini*
His Attorney.

United States Patent Office 3,447,286
Patented June 3, 1969

---

3,447,286
TOTALLY ENCLOSED LIQUID PERMSELECTIVE MEMBRANE
Angelo Dounoucos, Schenectady, N.Y., assignor to General Electric Company, a corporation of New York
Filed Aug. 2, 1967, Ser. No. 657,944
Int. Cl. B01d *59/14*
U.S. Cl. 55—16
20 Claims

ABSTRACT OF THE DISCLOSURE

A totally enclosed liquid membrane for the separation of gases is described wherein a porous body having more-or-less direct channels extending therethrough from face-to-face and providing at least about 10% open area is completely enclosed together with a selected liquid filling the channels between non-porous layers of solid permselective membrane material, the latter preferably having low permeability to the gas or vapor phase of the contained liquid.

---

In the specific embodiment described a fibrous Dacron mat and an aqueous solution are enclosed between thin silicone rubber membranes. The membranes are completely sealed around the edges. When in the wet condition (the void volume of the Dacron mat is full of the solution), the laminate is useable as a liquid gas separation membrane. While dry, as is the case when the water has left by permeation, the laminate is able to function as a gas separation membrane, but without the increased efficiency of a liquid gas separation membrane, particularly a liquid membrane adapted for facilitated transport.

The invention herein described was made in the course of or under a contract with the Department of the Air Force.

Background of the invention

The use of liquid (interpreted herein as including quasi-liquid) membranes for gas separation has been disclosed in U.S. application Ser. No. 468,727, Robb et al., filed July 1, 1965 (now U.S. Patent 3,335,545) and assigned to the assignee of this application and the aforementioned application is incorporated herein by reference. It was disclosed in this application that the function of the conventionally recognized solid non-porous polymer barrier well-known in the art for the separation of gases through the phenomenon of selective permeation may be conducted with an immobilized liquid film with the result that a considerable increase is obtained in the degree of separation of certain gases.

The term "quasi-liquid film" refers to a film of immobilized liquid such as may be prepared by saturating a porous matrix or by swelling a polymer film with the liquid proposed for effecting the separation, such that a liquid barrier is created, which itself becomes the controlling resistance to permeation. In many cases in order to be of use, the liquid and its support or immobilizing structure may be so correlated to enable the application of a significant pressure differential (at least about one atmosphere) across the liquid barrier without causing the liquid to be forced out thereby destroying the permselective barrier.

Immobilization or support of the liquid comprising such a film can be effected in a number of ways. Thus, for example, a thin liquid membrane can be supported on a porous backing of a material unwet by the liquid and having such fine holes therethrough that the liquid cannot penetrate the porous backing; the liquid film can be supported on a polymer film chemically inert thereto selected so that the ratio of permeation rate to thickness will be appreciably higher for the polymer than for the liquid film thereby insuring that the liquid film is the controlling permeation factor, or various polymer films can be made to take up large quantities of liquid as described in the Robb et al. application.

The very significant improvement in the effectiveness of liquid membranes for gas separation, when the phenomenon known as "facilitated transport" is introduced is disclosed in U.S. application Ser. No. 572,222, Ward et al., filed Aug. 15, 1966 (now U.S. Patent 3,396,-510) and assigned to the assignee of this application and the Ward et al. application, as well, is incorporated herein by reference. As is explained therein, the transport of a specific gas across a liquid film can be very substantially increased by introducing into an immobilized liquid film a large concentration of some selected, non-volatile specie reactive with that specific gaseous component, the reaction product being a non-volatile specie produced in large concentration.

By way of example, the effectiveness of facilitated transport is demonstrated in the Ward et al. application for the separation of carbon dioxide from a gas mixture in preference to oxygen by the addition to a liquid membrane of an amount of an alkali bicarbonate as, for example, sodium bicarbonate, potassium bicarbonate, cesium bicarbonate, etc., sufficient to provide a concentration of bicarbonate ions of at least one mole per liter. The resulting liquid membrane is rendered significantly more effective in $CO_2/O_2$ separation.

Further, improvement in gas separation is obtained by the addition of still another material to the modified liquid membrane, a catalyst functioning to increase the speed of the reaction(s) occurring in the liquid film for the specific transport being facilitated. Examples of catalysts disclosed in the Ward et al. application for $CO_2/O_2$ separation are sodium arsenite and carbonic anhydrase.

In the case of liquid films facilitated for the transport of sulfur dioxide thereacross, alkali sulfides are employed, for example, sodium sulfide, potassium sulfide, etc. Similarly, facilitated transport of oxygen may be obtained by the addition of a chelate to the liquid membrane or a material from the group defined as water soluble sulfonated cobalt (II) bis-salicylaldehyde amines.

One of the immobilized liquid film constructions successfully employed for the separation of gases is a modified cellulosic ester film having a structure substantially in accordance with that produced by the practice of the invention described in U.S. 3,133,132, Loeb et al. and U.S. 3,133,137, Loeb et al. Immobilized cellulose acetate films produced in accordance with the directions in the aforementioned patents may be adapted to facilitate transport by soaking the films in a solution of the desired non-volatile carrier specie present in the appropriate concentration.

However, in order to retain the high permeability and separation factor of such an immobilized liquid film, it must be assembled and, after assembly must be maintained, under humidity conditions of at least 70% relative humidity or greater. Such criteria make the fabrication and storage of such membranes complicated and expensive. In the event that such an immobilized liquid film is permitted to dry out the porous structure of the cellulose acetate membrane collapses resulting in a very substantial permanent loss in gas permeability. Also, while the membrane is operative there is no means to control or prevent loss of the non-volatile carrier specie from the membrane. For example, droplets of condensation accidentally coming into contact with the modified cellulose acetate membrane would dissolve and carry away the active specie resulting in gradual reduction performance.

Summary of the invention

This invention provides a totally enclosed liquid membrane for the separation of gases comprising in combination a special encasement, or envelop, containing a thin porous sheet of solid inert material wettable by the specific liquid component present within the envelope, when the composite is in fully operative condition as a permselective liquid membrane.

The envelope consists of a pair of solid films disposed facing each other and sealed around the periphery. These films need not be made of the same material or they may be made of the same material, but treated differently to impart different properties thereto. However, in general these films are to be (a) highly permeable to the gaseous component to be selectively separated from a gas mixture and (b) have a low permeability to the gas or vapor of the liquid component to be enclosed.

In the fully operative condition the enclosed liquid membrane consists of the porous sheet of solid inert material of substantially uniform thickness with sufficient liquid component to fill the pores. This sheet will usually be at least several times as thick as the encasement membranes, which normally are less than about 2 mils each in thickness. The pores of this sheet must be such that continuous channelling extends in continuous paths from face to face of the porous sheet providing substantially direct passage through the immobilized liquid membrane for the gas in transit in the liquid component during gas separation. The degree of porosity should provide at least about 10% open area in any plane section passed through the sheet substantially parallel to the major surfaces thereof.

If in addition to the liquid component, a solid additive is present within the envelop, which additive goes into solution in the liquid component and has such an affinity for the liquid that the additive when solid will remove the gas phase of the liquid from the atmosphere around the solid additive and convert it to the liquid phase, the laminated structure can be assembled dry (without the liquid component). In the dry state the laminated structure can be stored or shipped, eventually assembled into a stack complete with spacers and manifolds (for the introduction thereto of a gas mixture to be separated and removal of gaseous product streams) and then activated as an assembly. Activation of the enclosed porous mat can be accomplished easily, the assembled stack is placed and kept in an environment in which the concentration of gas or vapor (as in the case of water) of the liquid component is very high. When, for example, an aqueous solution of water and a hygroscopic solid serves as the liquid component for the laminated structure, it is only necessary to expose the structure to high humidity air (over 75% relavtie humidity) for an extended period of time. Because of the very significant difference in partial pressure providing the necessary driving force, the water vapor permeates the envelop and the hygroscopic solid absorbs the water vapor converting the vapor to liquid water and dissolving therein. Eventually enough water collects within the envelop to fill the pores of the porous mat and the totally enclosed liquid membrane may now be used for the selective separation of gases as, for example, the removal of $CO_2$ from the exhaled breath.

Should this packed liquid membrane (liquid components plus a solid as described above) be permitted to dry out as by extended exposure to an atmosphere low in gas or vapor of the liquid component, it may be rejuvenated in the same manner as has been described hereinabove to activate the dry laminate.

Brief description of drawings

The exact nature of this invention as well as objects and advantages thereof will be readily apparent from consideration of the following specification relating to the annexed drawing in which:

FIG. 1 is an exploded view partially in section to more clearly illustrate the relationship of the components of the laminate itself with the outside protection and support for the encasement membranes and FIG. 2 is a sectional view through the totally enclosed liquid membrane complete with outer protective structure and further schematically illustrating the wide diversity of pore configurations able to provide substantially direct transit from face to face through the liquid film and porous mat.

Description of the preferred embodiment

The totally enclosed liquid film package 10 specifically prepared for $CO_2/O_2$ separation consists of an open Dacron mat 11 treated by soaking in a cesium bicarbonate solution, saturated at the minimum temperature at which it is proposed to use the completed package, and then being allowed to dry. As the water evaporates from the solution the cesium bicarbonate precipitates as tiny crystals embedded in and around the fibers of mat 11. The mat 11 is then completely enclosed between sheets 12, 13 of silicone rubber (each ranging in thickness up to about 2 mils) with the entire periphery being sealed to seal 14 of the room temperature vulcanizing form of silicone rubber. The thickness of seal 14, of course, accommodates the thickness of mat 11, which can range in thickness from about 1 mil to about 5 mils depending on the thickness of the encasement membranes 12, 13.

Protection for thin silicone membranes 12, 13 is afforded by the open mesh cloths, or mats, 16 in combination with supporting screens 17. The cloth backing may be of cotton or synthetic fiber while the screen may have a mesh size (U.S. Sieve) ranging from about 10–50. With backing materials disposed on both sides of package 10, sharp reversals in pressure can be tolerated. If the occurrence of such pressure reversals is unlikely, the high pressure side of the package may be used without backing. Supporting screens 17 are employed in the stacked assembly of individual packages 10 to provide turbulent flow channels between adjacent protected packages 10, these channels communicating with various manifolds.

The selection of a useable combination of film 12, film 13 and liquid component to be employed will depend upon:

(a) the gases to be separated;
(b) the requirements for gaseous product purity in relation to product throughput required;
(c) the total pressure differential to be applied, and
(d) the individual thicknesses and permeabilities of the component layers.

The last mentioned aspect of preparing totally enclosed liquid membranes is controlled by the relationship:

$$\frac{1_p}{P_p}=\frac{1_a}{P_a}+\frac{1_b}{P_b}+\frac{1_c}{P_c}$$

where:

1=thickness (cm.)
P=permeability $$\left(\frac{cc. \times cm.}{sec. \times cm.^2 \times cm. \ Hg}\right)$$

with respect to a given gas
Subscript $p$ refers to the laminated package
Subscript $a$, $b$ and $c$ refer to individual films.

Thus, assuming:

$l_a = l_c = 1$ cm. silicone rubber
$l_b = 3$ cm. aqueous solution saturated with $CsHCO_3$
$(P_a, P_c)$ oxygen=$60 \times 10^{-9}$, $(P_a, P_c)$ $CO_2=300 \times 10^{-9}$—silicone rubber
$(P_b)$ oxygen=$0.05 \times 10^{-9}$, $(P_b)$ $CO_2=75 \times 10^{-9}$—aqueous solution without arsenite catalyst
$(P_b)$ oxygen=$0.05 \times 10^{-9}$, $(P_b)$ $CO_2=200 \times 10^{-9}$—aqueous solution with arsenite catalyst added.

It may be readily appreciated from the above that the ratio of carbon dioxide permeability to oxygen permeability for the CsHCO$_3$ solution without arsenite catalyst has a value of 1500:1, while the same ratio for CsHCO$_3$ solution with arsenite catalyst has a value of 4000:1.

Substituting the values of film thicknesses and permeabilities in the above equation for the case without arsenite catalyst the permeabilities for the laminated package in fully operative condition are as follows:

$$\frac{5}{P_p} = \frac{1}{60} + \frac{3}{.05} + \frac{1}{60}$$

$$P_p = .833 \times 10^{-9} \text{ (for oxygen)}$$

$$\frac{5}{P_p} = \frac{1}{300} + \frac{3}{75} + \frac{1}{300}$$

$$P_p = 107 - 10^{-9} \text{ (for CO}_2\text{)}$$

Therefore, the ratio of permeabilities is 1290:1.

Carrying out similar calculations for the laminated package for the case in which the aqueous solution saturated with CsHCO$_3$ contains arsenite catalyst:

$$\frac{5}{P_p} = \frac{1}{60} + \frac{3}{.05} + \frac{1}{60}$$

$$P_p = 0.0833 \times 10^{-9} \text{ (for oxygen)}$$

$$\frac{5}{P_p} = \frac{1}{300} + \frac{3}{200} + \frac{1}{300}$$

$$P_p = 231 \text{ (for CO}_2\text{)}$$

therefore, the ratio of permeabilities is 2780:1.

From a review of the above calculations it may be concluded that the effect of the encasement membrane is reduced when the thickness of the liquid film component is increased; the very substantial separation factor (ratio of permeabilities) of the liquid film is reduced by the presence of encasement membranes, which have a poorer separation factor, and the reduction in separation factor becomes more significant as the permeability to the gas to be removed (CO$_2$ in this case) increases as, for example, by the addition of a catalyst to the facilitated transport phenomenon.

Those totally enclosed liquid film packages 10, which do not contain appropriate solid additives to enable reactivation cannot be packaged in the dry state, but must be packaged wet (containing the liquid component). While in the liquid phase, the liquid component would be retained without loss by the non-porous membranes 12 and 13 (and seals 14). However, as gas (or vapor) phase is generated, this will permeate membranes 12, 13, if a difference in partial (or total) pressure exists. The rate of permeation and consequent loss will depend upon the permselective properties of the particular membrane materials. Thus, it is particularly important to employ membranes 12, 13 having low permeability with respect to the liquid component in laminated packaged liquid membranes, which cannot be re-activated.

However, by the proper selection of the packaging and membrane components the totally enclosed liquid permselective membrane becomes a lasting tool for gas separation, simpler and cheaper to construct in that the complex preparation of porous membranes to immobilize the liquid component has been obviated and in the case of aqueous films, at least, the necessity of maintaining damp such membrane matrices as cellulose acetate has been dispensed with as well.

The preferred manner of assembly of the structure 10 shown in FIG. 1 using silicone rubber membranes for membranes 11 and 12, silicone rubber for the seal 14, a Dacron mat for the separator 14 and saturated CsHCO$_3$ as the liquid component is to lay flat the bottom membrane 12, spread the Dacron mat 13 thereover, apply the seal 14 as a liquid to the periphery thereof bonding together film 12 and mat 13, level off the top edge of the seal 14 and then fill the container so formed with the liquid component (saturated CsHCO$_3$ with or without catalyst) to the level of the top of seal 14. This assembly is then allowed to stand until the water has evaporated therefrom leaving the solid facilitated transport agent in the assembly in the form of crystals deposited over and in the mat 13. The assembly is then completed by adhering the periphery of membrane 11 to seal 14, mat 13 holding the membranes 11 and 12 apart for eventual occupancy by water.

In the case of enclosed liquid films that cannot be reactivated the top membrane would be sealed into place without permitting evaporation of the liquid component.

Such a totally enclosed laminated package containing a dried cesium bicarbonate-soaked mat was tested for its capacity to absorb moisture from a humid ambient and it was found that sufficient permeation of water vapor occurs through the outer silicone faces 12, 13 of package 10 and enough water vapor is absorbed by the hygroscopic cesium bicarbonate and is converted to liquid that the pores of mat 11, become filled and the cesium bicarbonate crystals are dissolved, thereby providing a facilitated transport liquid membrane for gas separation.

The following test displays the high performance of a totally enclosed liquid membrane fully activated and constructed with 0.00381 cm. thick silicone rubber films, a Dacron mat 0.010 cm. thick with a 4 Normal solution of CsHCO$_3$ containing 2 Normal arsenite catalyst. A number of these packages were stacked into an assembly and provided with appropriate manifolds.

A mixture of 1½% CO$_2$ in pure oxygen, which mixture at a controlled relative humidity of 75% was circulated over one surface of each packaged liquid membrane 10 at atmospheric pressure, while the opposite surface of package 10 was subjected to a reduced pressure (about 25 millimeters of mercury absolute). Mass spectrometer analysis of the product gas stream established that the CO$_2$ content of the gas permeating through the packages 10 were 92.4% of the dry gases, the balance being oxygen. This performance amounts to a separation factor of 2347.

The nature and extent of the porosity of the inert porous layer 13 is not critical except that channelling must at least provide continuous communication through the separator from one face thereof to the opposite face regardless of meanderings such as is schematically represented in FIG. 2 for channels 18.

The terms "gas" and "vapor" as they appear in the appended claims are not intended to be mutually exclusive and where the one term is used and the other term would also be appropriate, both terms are intended.

Therefore, a new and useful construction for the separation of gases by selective permeation utilizing a uniquely packaged liquid membrane has been disclosed. Although the encasement members disclosed completely enclosing the liquid membrane have been of silicone rubber, other selectively permeable membrane materials may be employed in combination with aqueous films (pure or containing various facilitated transport agents) or with organic fluids, as for example, diethylene glycol, carvone (d) and eugenol (1,3,4). Data on the permselective properties of many solid plastic membranes and methods for preparation thereof have been disclosed in numerous patents and articles in the literature (for example, "Gas Permeability of Plastics" by Major et al., July 1962 issue of Modern Plastics, page 135 et seq.; U.S. 3,256,675, Robb; U.S. 3,274,750, Robb, and U.S. 3,325,330, Robb) and it, therefore, should be an obvious extension of the teachings set forth herein to select from the many possible combinations of materials available and construct variations of the totally enclosed liquid membrane construction as defined in the appended claims.

What I claim as new and desire to secure by Letters Patent of the United States is:

1. A laminated structure for the separation of a specific gas from a mixture of gases by permeation, said structure comprising in combination:
   (a) a thin sheet of porous material having a substantially uniform thickness, (1) the thickness of said sheet of porous material being very small in proportion to the length and width thereof, (b) a first membrane of thin, solid, non-porous material covering and in contact with one major surface of said sheet of porous material, (c) a second membrane of thin, solid, non-porous material covering and in contact with the opposite major surface of said sheet of porous material, (d) means for sealing together said first membrane, said second membrane and said sheet of porous material along the periphery thereof, (1) said first and second membranes each having a high permeability for said specific gas and having a thickness of less than about 2 mils and smaller than the thickness of said sheet of porous material, and (e) a quantity of solid hygroscopic crystalline material disposed in contact with said porous sheet for adsorbing the gas phase of a given material coming into contact therewith, converting said absorbed gas phase to the liquid state whereby the solid material then becomes dissolved in the liquid so generated, and (1) at least one of said first and second permeable membranes being permeable to the gas phase of said given material.

2. The laminated structure substantially as recited in claim 1 wherein the first and second membranes are of silicone rubber.

3. The laminated structure substantially as recited in claim 1 wherein the solid crystalline material is a facilitated transport agent for permeation of the specific gas through the liquid phase of the given material.

4. The laminated structure substantially as recited in claim 1 wherein the fibrous sheet is Dacron.

5. A laminated structure for the separation of a specific gas from a mixture of gases by permeation, said structure comprising in combination:

(a) a thin sheet of porous material having a substantially uniform thickness, (1) the thickness of said sheet of porous material being very small in proportion to the length and width thereof, (b) a first membrane of thin, solid, nonporous material covering and in contact with one major surface of said sheet of porous material, (c) a second membrane of thin, solid, nonporous material covering and in contact with the opposite major surface of said sheet of porous material, (d) means for sealing together said first membrane, said second membrane and said sheet of porous material along the periphery thereof, (1) said first and second membranes each having a high permeability for said specific gas and having a thickness of less than about 2 mils and smaller than the thickness of said sheet of porous material, and (e) a quantity of liquid sufficient to substantially fill the voids in said sheet of porous material.

6. The laminated structure substantially as recited in claim 5 wherein the enclosed liquid is water.

7. The laminated structure substantially as recited in claim 5 wherein the enclosed liquid is an organic liquid.

8. The laminated structure substantially as recited in claim 5 wherein the first and second membranes are of silicon rubber.

9. The laminated structure substantially as recited in claim 5 wherein the enclosed liquid is water containing a facilitated transport agent.

10. The laminated structure substantially as recited in claim 9 wherein the facilitated transport agent is cesium bicarbonate.

11. In an apparatus for altering the composition of a mixture of gases by permeation through a permeable membrane under the driving force of either a difference in partial pressure or a difference in total pressure, the improvement comprising:

(a) the permeable membrane comprising a laminated structure including a liquid barrier for gas permeating said permeable membrane, said liquid barrier filling the pores in a porous sheet and both said liquid barrier and said porous sheet being completely enclosed in a non-porous encasement, the opposing major surfaces of which encasement are thin permeable membranes.

12. The improvement substantially as recited in claim 11 wherein the liquid barrier is water and the permeable membranes are silicone rubber.

13. The improvement substantially as recited in claim 12 wherein the water contains a facilitated transport agent dissolved therein.

14. The improvement substantially as recited in claim 13 wherein the facilitated transport agent is cesium bicarbonate.

15. In a process for altering the composition of a mixture of gases by permeation through a liquid permeable membrane under the driving force of either a difference in partial pressure or a difference in total pressure, the improvement comprising the steps of:

(a) employing a thin porous sheet having a thickness very much smaller than either the width or length thereof and with the passages therethrough completely filled with liquid as a liquid permeable membrane, (b) completely enclosing said porous sheet and said liquid in a non-porous encasement, the major surfaces of which encasement are thin permeable membranes and (c) permeating at least one component of the gas mixture through said liquid permeable membrane and non-porous encasement.

16. The improvement substantially as recited in claim 15 wherein edges of the porous sheet are affixed to the thin permeable membranes covering the major surfaces thereof.

17. The improvement substantially as recited in claim 15 wherein the liquid is water.

18. The improvement substantially as recited in claim 15 wherein the liquid is a solution containing a dissolved solid material, which material in the solid state thereof has sufficient affinity for said liquid to be able to absorb the gas phase thereof and convert the absorbed gas to the liquid phase.

19. The improvement substantially as recited in claim 18 in which is included the added step of reactivating the liquid permeable membrane when required by subjecting said liquid permeable membrane non-porous encasement therefor to an environment having a high partial pressure in the gas phase of said liquid.

20. The improvement substantially as recited in claim 19 wherein the liquid is water and the solid is a facilitated transport agent.

References Cited

UNITED STATES PATENTS 3,335,545    8/1967    Robb et al. _____ 55—158
3,396,510    8/1968    Ward et al. _____ 55—16

REUBEN FRIEDMAN, *Primary Examiner.*

C. N. HART, *Assistant Examiner.*

U.S. Cl. X.R.

55—158